Figure 1:
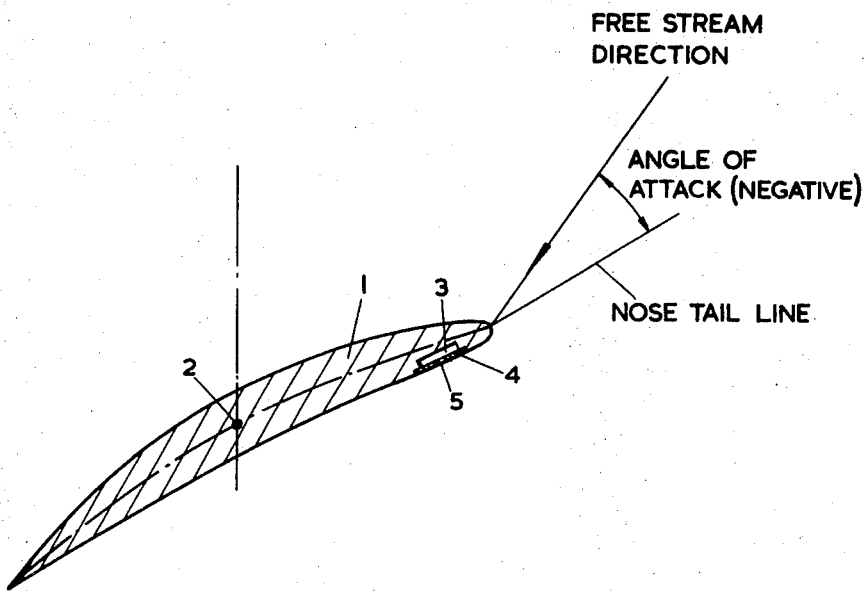

United States Patent

[11] 3,575,526

| [72] | Inventor | Leonard Anthonie van Gunsteren<br>Helvoirt, Netherlands |
|---|---|---|
| [21] | Appl. No. | 814,256 |
| [22] | Filed | Apr. 8, 1969 |
| [45] | Patented | Apr. 20, 1971 |
| [73] | Assignee | ILPS N.V. Drunen, Netherlands |
| [32] | Priority | Apr. 8, 1968 |
| [33] | | Great Britain |
| [31] | | 16,873/68 |

[54] SHIP'S PROPELLER AND METHOD OF CHANGING THE PITCH THEREOF
13 Claims, 2 Drawing Figs.

[52] U.S. Cl. .................................................. 416/1,
416/20, 416/90, 416/158
[51] Int. Cl. ..................................................... B63h 3/00
[50] Field of Search........................................... 170/135.4,
135.71; 416/90, 92, 158, 1, 20; 416/91, 231

[56] References Cited
UNITED STATES PATENTS

| 1,501,248 | 7/1924 | Strong.......................... | 416/91(X) |
| 2,556,710 | 6/1951 | Stalker......................... | 416/20 |
| 3,395,760 | 8/1968 | Hoffman...................... | 416/92 |
| 3,446,288 | 5/1969 | Yuan............................ | 416/20 |

Primary Examiner—Everette A. Powell, Jr.
Attorney—Young & Thompson

ABSTRACT: The forces necessary to change the pitch of a ship's propeller of variable pitch are reduced by reducing the hydrodynamic torque during the pitch change. This is done by passing fluid comprising a gas or a liquid through the propeller blade and emitting it from the propeller blade on the suction side of the blade at a distance of 3 to 15 percent of the width of the suction side of the blade measured from the leading edge.

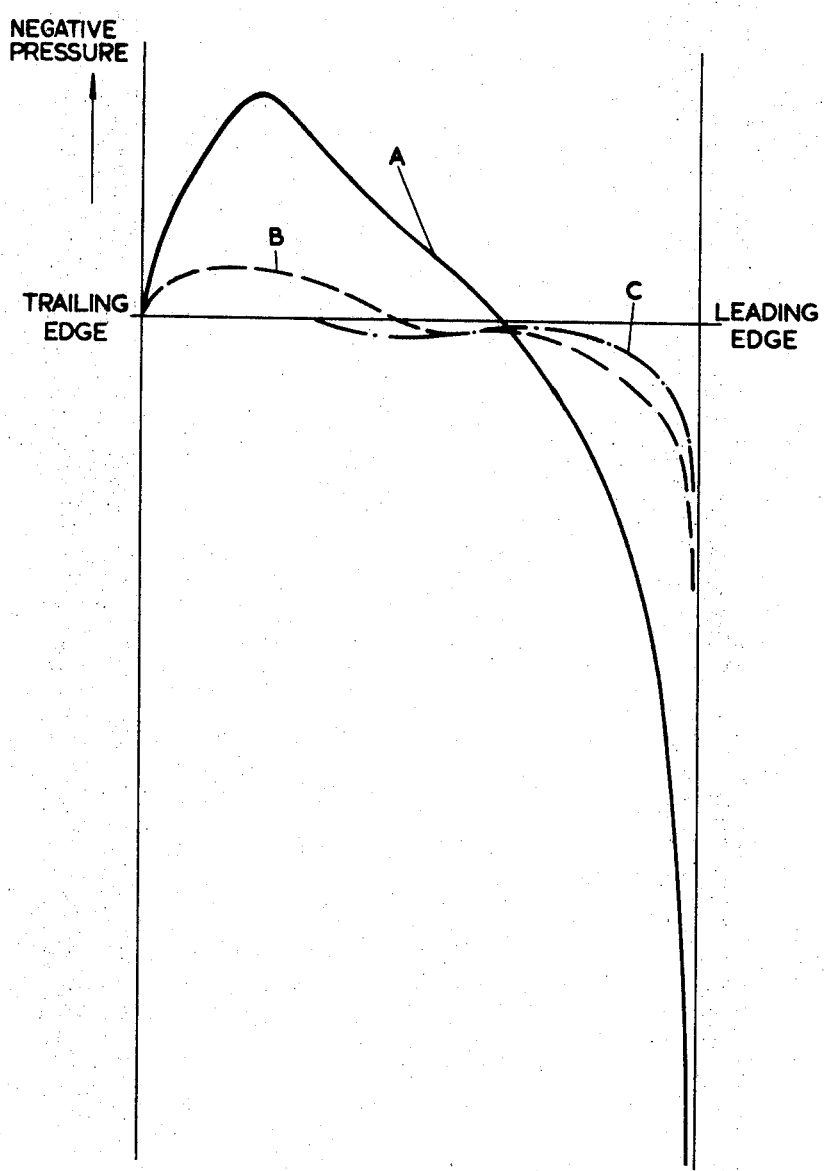

SHIP'S PROPELLER AND METHOD OF CHANGING THE PITCH THEREOF

The present invention relates to variable pitch ship's propellers, more particularly to apparatus and methods for reducing the hydrodynamic torque of the propeller at least during pitch change.

As is known, it is often necessary to exert great force to change the pitch of a ship's propeller, so that the actuating rods, links, pivots and so on have to be strong and heavy and much power is required for controlling the pitch.

The actuating forces are dependent on the magnitude of the blade spindle torque, which consists of three parts: a hydrodynamic torque, a friction torque and an inertia torque due to the centrifugal forces.

The hydrodynamic torque is roughly half the total blade spindle torque, so that a reduction of the hydrodynamic torque is very important for minimizing the actuating forces.

The hydrodynamic spindle torque may be reduced for instance by choosing a suitable skew (or blade outline and location of spindle axis).

It is impossible, however, to choose the skew in such a way that a low hydrodynamic torque is obtained over the whole range of operation.

The present invention reduces the hydrodynamic spindle torque and thus minimizes the actuating forces, by injection of pressurized or unpressurized gas or liquid through holes in the blades of the propeller, the gas or liquid being supplied to the holes through passageways in the propeller shaft and in the actuating mechanism.

Injection of air through or along the blades of a propeller, whereby the air is discharged to the surrounding water through a number of openings, is known per se and is called ventilation of the propeller. Ventilation is used for high-speed propellers with fixed pitch blades in order to avoid partial cavitation, which causes cavitation erosion, or in order to reduce noise, for instance for submarines.

Without ventilation or other hydrodynamic means, the highest spindle torques are generally encountered at reduced pitch settings. The associated chordwise pressure distribution tends to put the blade strongly into its astern position, due to an underpressure on the face of the blade at the leading edge and an underpressure on the back of the blade at the trailing edge.

However, by using ventilation or other hydrodynamic means with a controllable pitch propeller according to the present invention a more favorable pressure distribution over the blade area with regard to blade spindle torque can be obtained.

With ventilation or other hydrodynamic means, the suction pressure will be more equally distributed over the whole blade area.

Of course, ventilation or other hydrodynamic means require some power and incur costs, but these complications are more than compensated by the lower mechanical forces involved.

In general, ventilation or other hydrodynamic means need only to be used during pitch control. However, under certain special circumstances, ventilation may also be used continuously.

Accordingly, it is an object of the present invention to provide a ship's propeller of variable pitch, in which the hydrodynamic torque during pitch adjustment may be substantially reduced.

Another object of the present invention is the provision of a method for controlling the pitch of a ship's propeller, which enables the use of reduced force.

Finally, it is an object of the present invention to provide a variable pitch ship's propeller which will be relatively simple and inexpensive to construct, easy to operate, maintain and repair, and rugged and durable in use.

Other objects and advantages of the present invention will become apparent from a consideration of the following description, taken in connection with the accompanying drawings, in which:

FIG. 1 is a cross section of a variable pitch ship's propeller blade according to the present invention; and FIG. 2 is a graph of pressure distribution along the contour shown in FIG. 1.

Referring now to the drawings in greater detail, there is shown a propeller blade 1 which is one of the blades of a controllable pitch propeller of a ship. During pitch control the blade is swiveled around a swivel axis 2. Such propellers are in general well known in the art.

Upon decreasing the pitch of blade 1 from its design position, so that the effective angle of attack tends to become negative, a pressure distribution is obtained which can be considered to be made up of three parts:
1. a basic pressure distribution associated with the camber of the section, which is the design pressure distribution;
2. a pressure distribution of a noncambered profile or flat plate under a negative angle of attack; and
3. a pressure distribution associated with the distortion of the mean line due to pitch changing.

The total pressure distribution is indicated by the curve A in FIG. 2.

Both the "flat plate" pressure distribution and the "distortion" pressure distribution have an increasing effect on the blade spindle torque. Consequently the hydrodynamic blade spindle torque will increase the more the angle of attack becomes negative and the more the pitch is astern.

In practice, however, the largest actuating forces are not encountered in the astern condition, but in the vicinity of the point of zero thrust. This is caused by the effect of cavitation which considerably affects the pressure distribution at negative pitch settings. In particular, the "flat plate" pressure distribution is "cut off" by the cavitation number.

As in the partially cavitating condition the lift is known to be hardly affected, the cutoff "pressure area" at the nose will be compensated by an approximately equal additional area at the rear of the chord. The larger the region of cavitation, the more favorable the pressure distribution will be with regard to the blade spindle torque.

As will be seen from curve A, the negative pressure at the leading edge of the blade is very high. FIG. 2 shows the operating condition of the propeller with a slightly negative pitch setting.

This very high negative pressure at the leading edge is reduced according to the present invention by ventilating air through the face of the blade, that is the nominal pressure side, which now acts as the suction side.

Preferably the air inlets are located on the face at 3 percent to 15 percent of the distance from the leading edge to the trailing edge, as seen in FIG. 1.

As is also shown in FIG. 1, a chamber 3 is disposed in one face of the blade, covered by a plate 4 provided with a number of openings 5. This plate 4 can be fixed to the face of the blade 1 by cementing, welding or in other ways.

The air is supplied to the air inlets through passages passing through the propeller shaft, the actuating mechanism, the spindle and the blade.

The pressure distribution with air ventilation on one side is indicated by the curve B in FIG. 2. It is clear that the pressure is more equally distributed over the chord length of the blade and the resulting torque around the swivel axis 2 of the blade is greatly reduced, so that the torque due to hydrodynamic forces is much lower than without ventilation. Since the hydrodynamic torque is roughly half the total blade spindle torque, ventilation through holes on the face of the blade can lower the actuating forces by 50 percent or more.

The air inlets are normally arranged at the face of the blade, thus at the nominal pressure side. If a very great skew is used, for instance in view of vibrations, the running ahead condition is determining for the maximum blade spindle torque. In this special case the air inlets should be arranged at the back of the blade, thus at the real suction side. The propeller is then to be ventilated when the pitch has to be increased, while the propeller is operating at positive pitch settings thus in the ahead condition. Normally, however, the air inlets are arranged at the face of the blade.

It is also possible to apply ventilation on both sides of the blade, as shown by curve C in FIG. 2, resulting in a further reduction in blade spindle torque.

Instead of air, pressurized water or some other liquid may be injected. The means for injecting water or liquid need not be described in greater detail. The present invention is principally concerned with ventilation or other hydrodynamic means to minimize the actuating forces of a controllable pitch propeller, so that ventilation or other hydrodynamic means are only necessary during pitch control. Of course, when the propeller is provided with means for supplying air or liquid to the blades, these means may also be used after pitch control in order to avoid cavitation erosion and/or to reduce noise.

In view of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention, as defined by the appended claims.

I claim:

1. A method for controlling the pitch of a bladed ship's propeller, comprising changing the pitch of the propeller, and during the changing of the pitch of the propeller injecting a fluid through at least one side of the blades of the propeller from inside the blades into the water outside the blades at points more closely adjacent the leading edges than the trailing edges of the blades.

2. A method as claimed in claim 1, and conveying the fluid through the blades to the place of injection.

3. A method as claimed in claim 1, and injecting the fluid at the face of the blades.

4. A method as claimed in claim 1, and injecting the fluid at the back of the blades.

5. A method as claimed in claim 1, and injecting the fluid from both sides of the blades.

6. A method as claimed in claim 3, and injecting the fluid at a distance of 3 percent to 15 percent of the width of the blades measured from their leading edges.

7. A method as claimed in claim 1, and injecting the fluid through a multiplicity of openings through a surface of the blades.

8. A method as claimed in claim 1, said fluid being air.

9. In a variable pitch propeller for a ship, a propeller blade of variable pitch, and means for injecting fluid at at least one side of the blade from inside the blade into the surrounding water during changes in pitch of the blade, at points more closely adjacent the leading edge than the trailing edge of the blade.

10. A propeller as claimed in claim 9, the blade having a chamber recessed therein for the reception of said fluid, and a multiperforate plate closing the chamber.

11. A propeller as claimed in claim 10, the outer surface of the plate being flush with the adjacent surface of the blade.

12. A propeller as claimed in claim 9, said means for injecting fluid being disposed between 3 percent and 15 percent of the distance from the leading edge to the trailing edge of the blade.

13. A propeller as claimed in claim 12, said means for injecting fluid being disposed on the face of the blade.

UNITED STATES PATENT OFFICE
CERTIFICATE OF CORRECTION

Patent No. 3,575,526          Dated April 20, 1971

Inventor(s) Leonard Anthonie Van Gunsteren

It is certified that error appears in the above-identified patent and that said Letters Patent are hereby corrected as shown below:

On the cover sheet [73], "ILPS N.V." should read -- LIPS N.V. --.

Signed and sealed this 30th day of May 1972.

(SEAL)
Attest:

EDWARD M. FLETCHER, JR.
Attesting Officer

ROBERT GOTTSCHALK
Commissioner of Patents